US010891806B1

(12) United States Patent
Chaudhuri (10) Patent No.: US 10,891,806 B1
(45) Date of Patent: Jan. 12, 2021

(54) MOBILE PHONE AND CLOUD BASED VIRTUALIZED PARKING METER SYSTEM

(71) Applicant: Sid Chaudhuri, East Brunswick, NJ (US)

(72) Inventor: Sid Chaudhuri, East Brunswick, NJ (US)

( * ) Notice: Subject to any disclaimer, the term of this patent is extended or adjusted under 35 U.S.C. 154(b) by 48 days.

(21) Appl. No.: 16/364,743

(22) Filed: Mar. 26, 2019

Related U.S. Application Data

(60) Provisional application No. 62/725,828, filed on Aug. 31, 2018.

(51) Int. Cl.
*G07B 15/02* (2011.01)
*G06Q 10/02* (2012.01)
*G06Q 20/32* (2012.01)

(52) U.S. Cl.
CPC ............. *G07B 15/02* (2013.01); *G06Q 10/02* (2013.01); *G06Q 20/322* (2013.01)

(58) Field of Classification Search
None
See application file for complete search history.

(56) References Cited

U.S. PATENT DOCUMENTS

| 2004/0181439 | A1* | 9/2004 | Kakuta | G06Q 10/025 705/5 |
| 2006/0227010 | A1* | 10/2006 | Berstis | G08G 1/14 340/932.2 |
| 2012/0056758 | A1* | 3/2012 | Kuhlman | G08G 1/14 340/932.2 |
| 2012/0092190 | A1* | 4/2012 | Stefik | G08G 1/147 340/932.2 |
| 2012/0265434 | A1* | 10/2012 | Woodard | G08G 1/147 701/423 |
| 2014/0249742 | A1* | 9/2014 | Krivacic | G06Q 10/02 701/400 |
| 2016/0163119 | A1* | 6/2016 | Bashani | G07B 15/02 705/13 |
| 2017/0206471 | A1* | 7/2017 | Dermosessian | G07B 15/02 |
| 2017/0323227 | A1* | 11/2017 | Sadeghi | G06Q 20/102 |
| 2018/0121833 | A1* | 5/2018 | Friedman | G06Q 10/0631 |
| 2018/0285657 | A1* | 10/2018 | Koreishi | G08G 1/146 |
| 2019/0019407 | A1* | 1/2019 | Nakhjavani | G06K 9/00812 |
| 2019/0066505 | A1* | 2/2019 | Salvucci | G07F 17/24 |

* cited by examiner

*Primary Examiner* — Kenny S Lin (57) ABSTRACT

The present invention provides a virtualized parking meter system using the GPS location information of a user's mobile phone, cloud-based servers, databases and software application programs. A user application program is installed in the user's mobile phone. In response to receiving the GPS location data of the mobile phone from the application program the server generates and sends a virtualized map of one or more blocks in the neighborhood of the user. The virtualized map is created by superimposing space numbers assigned to the parking spaces on a commercially available map. The user selects a parking space and indicates a parking duration via the application program. The system collects payment using an online payment method for the duration and starts a timer. The system sends parking status of one or more block in response to a query from the parking system operator.

23 Claims, 6 Drawing Sheets

MOBILE PHONE AND CLOUD BASED VIRTUALIZED PARKING METER SYSTEM

FIELD OF THE INVENTION

This invention generally relates to a parking meter system using a cloud computing system and a mobile phone, and specifically improvements in which no physical parking meter or roadside parking sign is required.

BACKGROUND OF THE INVENTION

This invention relates generally to a parking meter system which allows a driver to make payment for parking their vehicles on a street or in a parking garage without the need for any physical parking meter for tracking the duration of parking and accepting payment with coins or credit cards.

In most of the current parking systems, there is a specific parking meter associated with a specific parking space. The parking meter has a means of accepting payment either by coins, bills or credit cards. It also includes a timer. A driver makes a payment for the specific space she parks her car for a specific amount of time. The meter indicates the payment and valid parking with a green light, or the amount of time left on a display included in the meter. While the system works well, there is significant deficiency in that it is expensive to install and maintain the meters. In addition, payment by coin or cash also requires collection of the money from thousands of meters. That adds significant operation cost. Thus, there is a need for a system and method of parking payment and collection without the need of physical parking meters.

Attempts have been made previously to provide improvements to current parking meter systems. Examples of such attempts are found in the U.S. Pat. Nos. 6,791,473; 8,749,403; 9,123,058; 9,123,184; 9,536,370; 9,536,235; 9,524,498; 9,536,235; 9,697,506; and 9,691,190. These systems and methods for various improvements to the current parking meter systems include: alerting the operator when paid parking time has expired, providing empty parking space information to a driver, providing parking meter data to an operator via wireless network, and recording parking location in a mobile phone to remind a driver where her vehicle is parked. In addition, there are parking meter systems for payment by mobile phones. All these previous improvements are on single space physical parking meter systems.

There are also parking meter systems that allow a driver to use an app in a mobile phone to pay for parking from anywhere. This system does not require a physical parking meter. ParkNYC is such a system. However, this system is based on a requirement that all blocks, sub-blocks or parking areas are designated to a zone identified by zone number. There are signs near the parking areas identifying the zone number. The driver uses the zone number and the vehicle license plate number to activate a paid parking session. The operator agent can check active parking sessions in a zone and compare with the vehicles parked in the zone to identify parking violations. While this is a convenient system, it still requires a municipality to allocate zones and install signs with zone numbers.

Thus, there is a need for a parking meter system that requires neither a physical parking meter nor signs to be installed to indicate zone numbers.

SUMMARY OF THE INVENTION

A virtualized parking meter system is provided in which there is no physical parking meter. Instead, the parking meter is virtualized using the GPS location information of a mobile phone, and a cloud-based server and software application programs. Each parking space on a street block is assigned a unique virtual identifier typically a number. The virtual identification is hereafter called the parking space number, the space number, virtual space number, or similar nomenclature. The space number allocation data along with the maps of the street blocks are generated and stored in one or more databases in the cloud computing platform. The parking space numbers do not need to be unique from block to block. A user application program (UApp) is provided for the users to install in their mobile phones. When a driver is near an available parking space, she opens the App. The UApp collects the location data of the phone and sends it to a server in the cloud platform. In response to receiving the location data from the user, the server sends a virtualized map of the street block corresponding to the location of the user. The virtualized map includes the assigned virtual numbers of the parking spaces superimposed on a regular street map. The virtualized map may be created in the server by superimposing the assigned space numbers on the spaces visible in the image of a street which may include the single parking space markers. Alternatively, the virtualized map can be generated in a computer from a common map image and with the knowledge of the dimensions of the parking spaces and/or the number of spaces in the block. From the virtualized street block map received through the UApp, the user identifies the space in which her vehicle is parked or is to be parked. The system collects the parking fee either through a pre-established account or through any of the online payment or mobile payment systems. The parking meter system then updates the virtualized map with the information that the specific space is occupied by a vehicle along with the vehicle license plate number. The license plate number and other information such as make, model and color of the vehicle can be obtained by the server from the pre-established account. If there are multiple vehicles associated with the account, then the server can request the user to select the vehicle from the vehicles associated with the account. Alternatively, the user can send the vehicle information to the server.

The virtualized map data could attach other pertinent information of the vehicles parked in the block. For example, the map data can include the make, model and color of the vehicles for easy recognition by a user or a parking agent.

Upon return, the user opens the UApp again and deactivates the parking session to vacate the parking spot when she leaves. The server, receiving the deactivation indication, updates the database to indicate that the parking space is now vacant.

The virtualized parking meter system includes an operator application program (OApp). The OApp is installed in a mobile device for use by an agent of the operator such as a traffic police. When the OApp is opened by the agent, the mobile device sends its location data of the agent to the cloud server. In response, the server collects the current parking status of the block corresponding to the agent location and sends it to the agent's mobile device as a virtualized map with the spaces for which parking fees have been paid. The virtualized map includes the vehicle information for each space where a vehicle is parked according to the database. The agent can easily identify a vehicle for which parking fee is due by comparing the virtualized map with the real vehicles parked on the street block. The agent can take appropriate action either via the OApp or by a currently used practice such as issuing a parking violation ticket.

The identification of vehicles parked illegally can be further automated. The parking agent can take a picture of the street and send it to the cloud server. The cloud server can compare the vehicles parked with the vehicles parked according to its database. The server can use an image processing software e.g., an Artificial Intelligence (AI) based software for making an accurate comparison and identifying illegally parked vehicles. The cloud server can then send a map with the illegally parked vehicles visually identified such as with red color.

Sometimes the location data may be near or at a cross-section of two roads. Whenever the server system cannot definitively determine the block of interest, the server system can send the virtualized map of multiple blocks adjacent to the location. The virtualized map can also include data for neighboring blocks even when the server system definitively determines the location in a particular block.

Additional features of the virtualized parking meter system are also provided. For example, a user can search for a parking space and reserve a space before driving to the location by sending a street name or cross-street names to the server. Based on the query from the user, the cloud server sends a virtualized map to the user with indication of available spaces on the street. The user then selects a space and reserves it for parking her car. The virtualized parking meter system then updates its database to indicate that the reserved space is no longer available to other users.

A user can have the system automatically pay for additional parking time without having to worry about parking time expiry. Alternatively, the user may not have to specify the duration of parking at all. When the driver vacates the space and deactivates the UApp the system can automatically calculate the parking fee and any fine for exceeding time limit and collect the fees from the user account via automatic bank transfer.

The operator can check online if a vehicle is in a space according to the virtualized map data, but the allotted parking time has expired and take appropriate actions. Alternatively, the parking system can keep track of the duration of the parked vehicles and it can send an alert to the operator whenever the time limit exceeds for a parked vehicle.

Super accurate GPS systems that can provide location accuracy within 10 cm are expected to be available soon. With such accurate GPS systems, the user may not even have to select the parking space from the virtualized map. With such accurate GPS systems, the vehicle location in the parking space could be the used as the parking space identifier and the steps of sending virtualized maps to the user could be eliminated.

The software can be modified for the virtualized parking system to work in a parking garage where the GPS system may not provide accurate data particularly in a multi-storied garage. For example, data representing the parking deck may be preloaded into a storage server in the cloud. The data may include images of the parking deck floor by floor. The virtualized system upon receiving the GPS location of the user, when she opens the UApp, determines from the location information that the user wants to park on a parking deck for which floor by floor image already has been uploaded. The system sends the floor by floor image of the deck to the user's mobile device. The user then selects an available space in one of the floors and proceeds to park and pay as described earlier. The system may only send the image of a particular floor instead of the entire deck if the user provides a particular floor information via the UApp. The user knows that she wants to park on a deck. So, the UApp can be designed so that the user can include the floor information when she opens the UApp. Alternatively, when the virtualized system determines that the user intends to park on a deck it can request the user to enter the floor number of the space. Upon receiving the floor number, the system sends the image of only that floor to the user's mobile device and the user proceeds to select the space from the floor image.

A virtualized system software can be modified to allow the operator to implement new policies easily and quickly by software updates.

DETAILED DESCRIPTION

Figure 1:
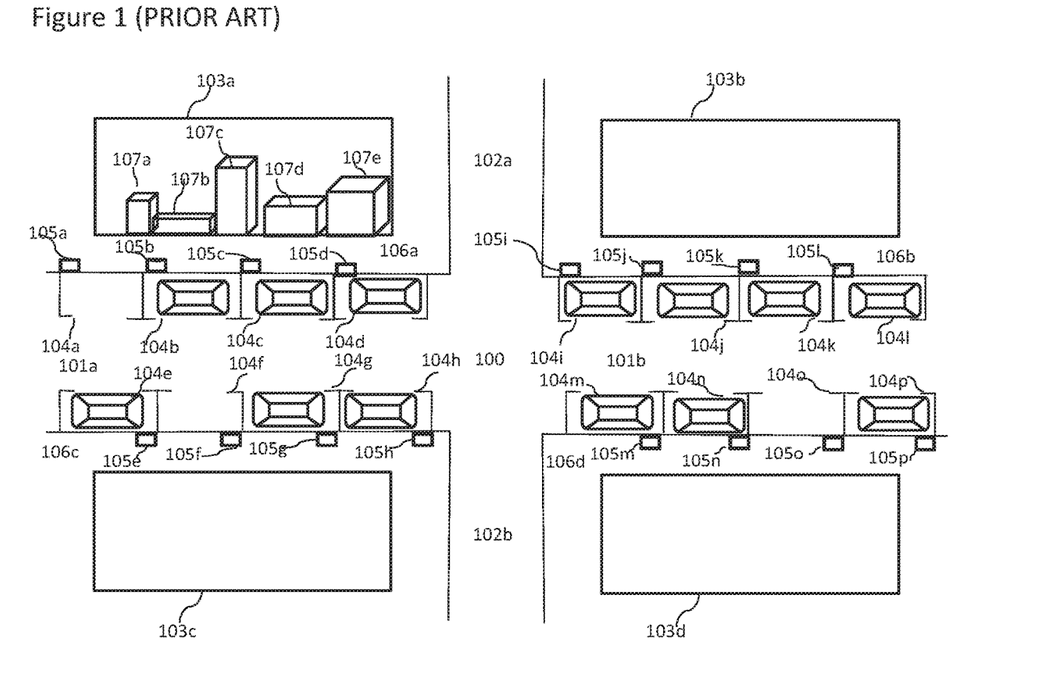
FIG. 1 depicts a schematic diagram of the salient components of a conventional parking meter system.

FIG. 1 depicts the salient components of a conventional parking meter system. Parking meters 105*a-p* corresponding to the parking spaces 104*a-p* are shown along the curbsides of the two blocks 101*a* and 101*b* of a road with a cross-section 100 between two cross roads 102*a* and 102*b*. Buildings 107*a* through 107*e* are shown in the spaces 103*a* between two road blocks. The spaces 103*b-d* may have buildings, parks or fields (not shown). Each one of the parking meters 105*a-p* has a timer and a means of payment either by cash or by credit card. A user pays for parking at the parking meter 105*x* corresponding to her parking space 104*x*. The timer is set when the payment is made, and it expires after the duration for which the payment is made. The parking meter operator periodically checks for any violation by checking expired meters and takes appropriate action.

Figure 2:
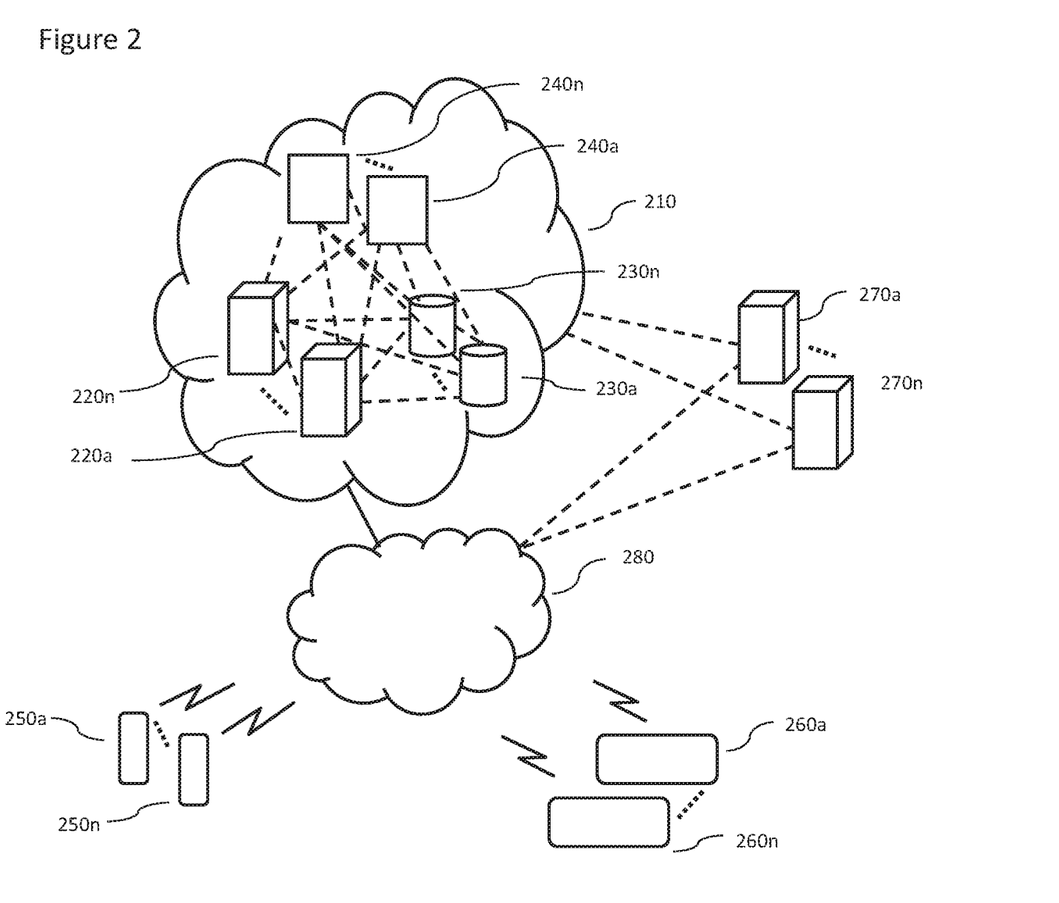
FIG. 2 depicts a schematic diagram of the salient components of a virtualized parking meter system in accordance with the current invention.

FIG. 2 depicts a schematic diagram of the salient components of a virtualized parking meter system in accordance with the current invention. In one exemplary embodiment, the virtualized parking meter system is implemented in a cloud system 210 which includes server computers 220*a-n*, database storage computers 230*a-n* and administration computers 240*a-n*. The server computers 220*a-n* include one or more processors, one or more memories, and one or more software programs. The server computers 220*a-n* communicate with mobile devices 250*a-n* used by drivers via a network 280.

The mobile devices 250*a-n* include at least one processor, a memory, a GPS (Global Positioning System) device, and a software application program for communication with the servers 220*a-n*. The software application programs in the mobile devices 250*a-n* are hereafter called UApp. The mobile devices 260*a-n* are used by operators of the parking meter system. The mobile devices 260*a-n* include at least one processor, a memory and a software application program for communication with the server computers 220*a-n*. The software application programs in the operator's mobile devices 260*a-n* are hereafter called OApp.

The database storage computers 230*a-n* store data for the parking meter system including map data, user account data, and operator's policy data. The computers 240*a-n* are computers to assist the server computers 220*a-n* for functions including user authentication, parking meter charging calculation, alert generation for users and/or operators, and map generation. The computers 220*a-n*, 230*a-n* and 240*a-n* communicate with each other for the processes and communications required for the parking meter system via a network for the cloud system 210. The network of the cloud system may be a standalone network or can be a part of the network 280. The functions of the computers 220*a-n*, 230*a-n* and 240*a-n* can be implemented in a single physical hardware or can be distributed among multiple hardware systems. The server computers 270*a-n* are computers external to the parking meter system. The computers 270*a-n* may belong to banks or other agencies providing functions such as money transfer from user's bank accounts to the parking meter system or from the parking meter system to the operator's bank accounts, and collection of map data from an Internet service provider.

Figure 3:
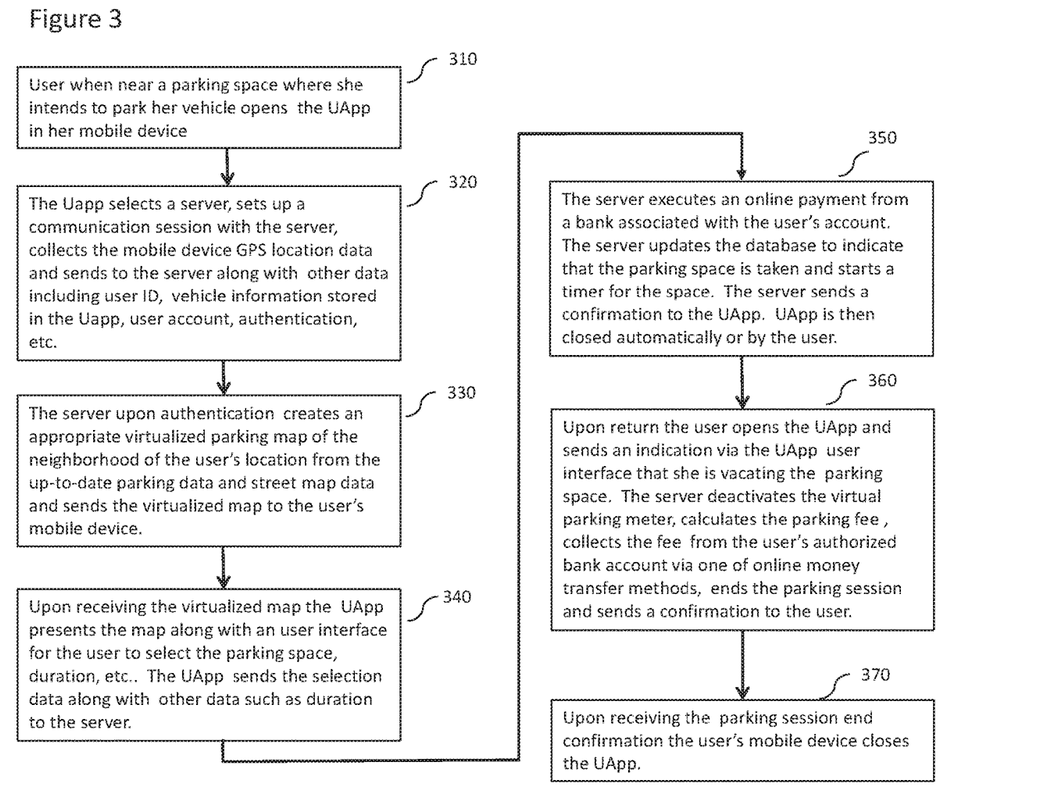
FIG. 3 depicts a flow chart of the steps according to an exemplary embodiment of the current invention.

FIG. 3 depicts a flow chart of the steps according to an exemplary embodiment of the current invention. In the first step 310, a user opens the UApp in her mobile device 250*a* and indicates through the UApp that she intends to park a vehicle in the vicinity of her location. In the step 320, the UApp selects a server computer 220*a* and creates a communication session with the cloud including the server computer 220*a* via the network 280. Upon successful session creation the UApp collects the location data from the GPS device in the mobile device 250*a* and sends a parking request message to the server computer 220*a* via the network 280. The parking request message includes a set of data such as the location data of the mobile device, user identification and authentication information, vehicle information, etc. stored in the mobile device. In step 330, the server computer 220*a* in response to receiving the parking request message authenticates if the user is a valid user and determines whether the user account is in good standing. If the user is properly validated then the server computer 220*a* by itself or in concert with the computers 220*b-n*, 230*a-n* and 240*a-n* generates and sends a virtualized map of the user's neighborhood. In step 340, the UApp in the user's mobile device 220*a* presents the virtualized map to the user via a Graphical User Interface (GUI). The user selects a parking space presented in the virtualized map via the GUI. The selection can be made by the user using the touch screen in her mobile device by pressing on the intended parking space in the virtualized map. The UApp sends the selection information to the server computer 220*a* including contextual data such as intended duration of parking, timer expiry alert request and such. In the step 350, the server 220*a* initiates a process to update the database in one or more of the database computers 230*a-n* indicating that the parking space is now taken and starts a timer for a parking session for the space. The server 220*a* sends a valid parking confirmation to the UApp. The server 220*a* executes an online payment for a predetermined duration of parking from a pre-established account, via credit card or other online payment systems. The 220*a* then sends a parking confirmation to the user. Alternatively, the server can calculate the parking duration and collect payment at the end of the parking session. The UApp upon receiving the confirmation ends the communication session with the server computer 220*a*. The UApp is then closed automatically or by the user.

In the next step 360, the user opens the UApp to vacate the parking space when she returns. The UApp sets up a communication session with one of the server computers 220*a-n* and sends an indication via the UApp GUI that she intends to vacate the parking space. The server 220*a* deactivates the virtual parking meter, calculates the parking fee if not prepaid, collects the fee from the user's authorized bank account in one of the bank server computers 270*a-n* via one of many well-known online money transfer methods, and sends a payment confirmation to the user.

In the step 370, upon receiving the parking session end confirmation, the UApp closes the communication session.

Figure 4:
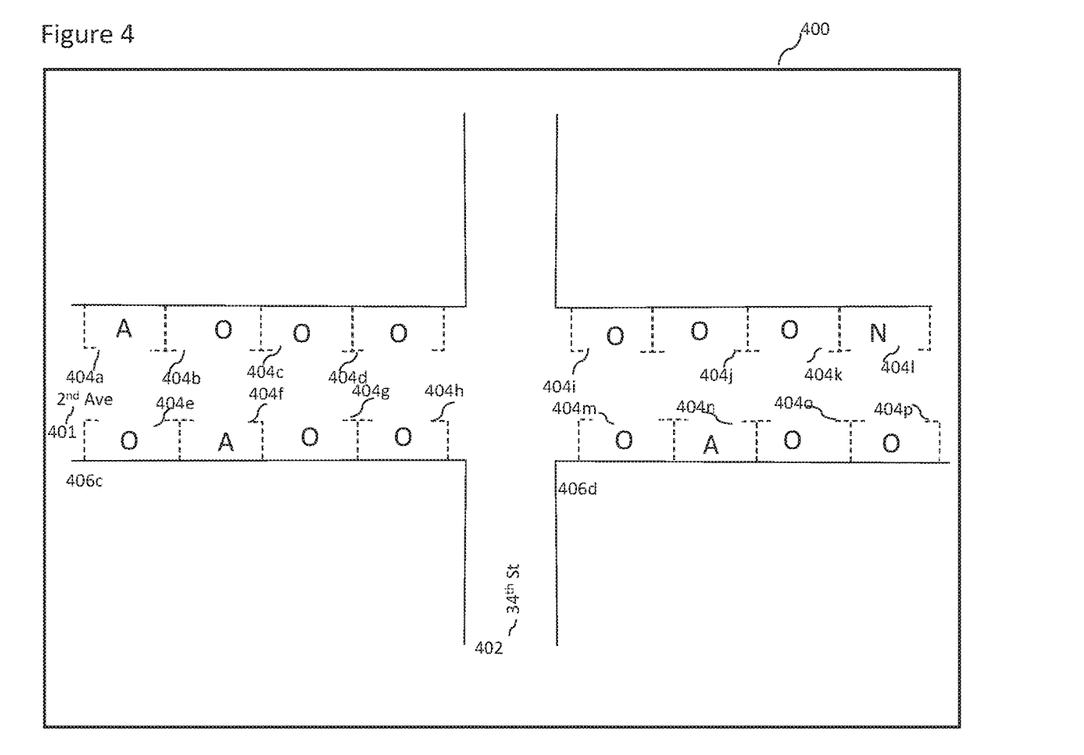
FIG. 4 depicts a schematic diagram of the salient components of a virtualized parking map according to one embodiment of the current invention.

FIG. 4 depicts a schematic diagram of the salient components of a virtualized parking map according to one embodiment of the current invention. The virtualized map 400 sent by the server 220*a* includes a schematic diagram of marked parking spaces 404*a-p*, street names 401 and 402 and a status designation for each of the parking spaces 404*a-p* whether the space is available for parking (A), occupied (O) or no-parking (N). In the street map, the parking spaces can be actual images of the streets or schematic diagrams created and stored in the parking meter system. The map can include one or more street blocks. For example, the parking meter system can include adjacent blocks in the map if there is no parking space available in the block where the user's mobile device currently is, but parking spaces are available in adjacent blocks. In another example, if the driver's location is near a cross-section then the map can include the street blocks adjacent to the cross-section.

The user can select the intended parking space in the received virtualized map displayed in her mobile device by touching at the intended space in the virtualized map. Alternatively, the server 220*a* can assign numbers to the parking spaces and the numbers can be shown in the virtualized map. The user can select a parking space by entering the appropriate number in the mobile device via the UApp.

Figure 5:
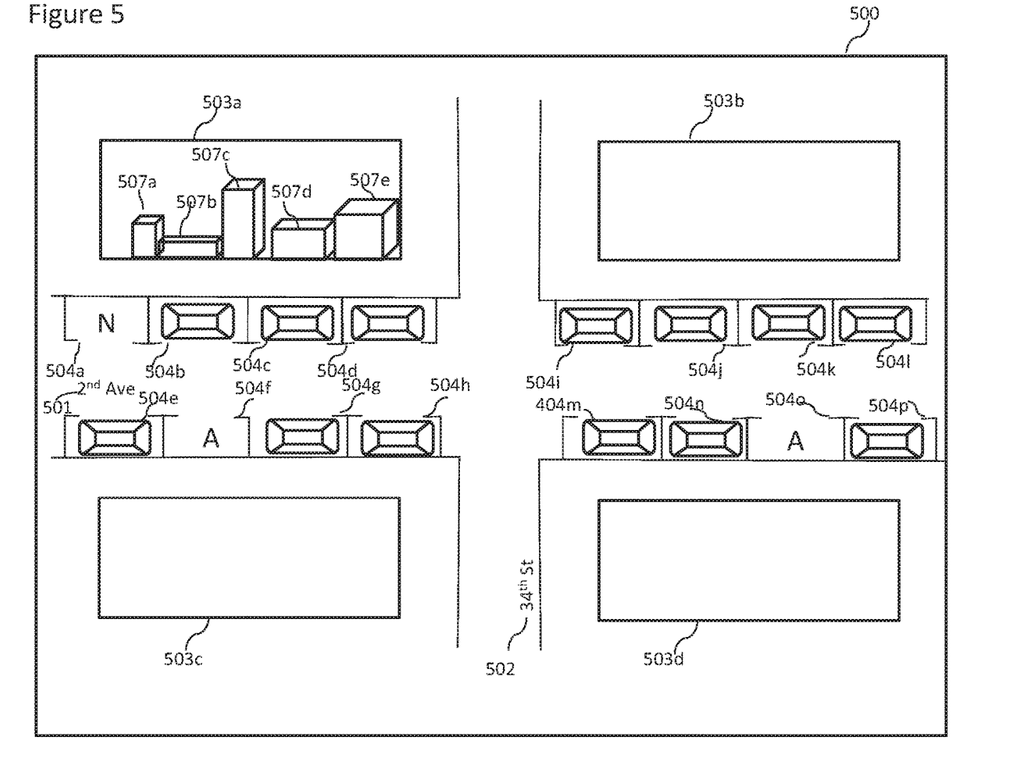
FIG. 5 depicts a schematic diagram of the salient components of a virtualized parking map according to another embodiment of the current invention.

FIG. 5 depicts a schematic diagram of the salient components of a virtualized parking map according to another embodiment of the current invention. The virtualized map 500 sent by the server 220*a* includes actual image of the street blocks, parking spaces 504*a-p*, status of parking spaces and street names superimposed on the street image. The parking status information of the occupied spaces 504*a-e,g-n,p* may include vehicle information such as license plate numbers, vehicle make, model and color. The parking meter system can collect the vehicle information from the data stored in the user account information. If there are more than one vehicle associated with the account then the parking meter system can interrogate the UApp for information of the specific vehicle being parked. The street names 501 and 502 are superimposed on the image of the street blocks. The actual image of the virtualized map may include the images of the buildings, parks, etc. as commonly seen in a real map such as a satellite map. The status designation for each of the parking spaces 504*a-p* whether the space is available for parking (A), occupied with image of a vehicle and license plate number, or no-parking (N). The street map 500 is created by the parking meter system using a map database, parking status information and account information stored in the database systems 230. The parking meter system determines the size of the map i.e., how many blocks, which blocks, surroundings of the blocks, etc. from the location information sent by the UApp. The map size selection may also depend on the availability of a parking space in the neighborhood of the vehicle.

Figure 6:
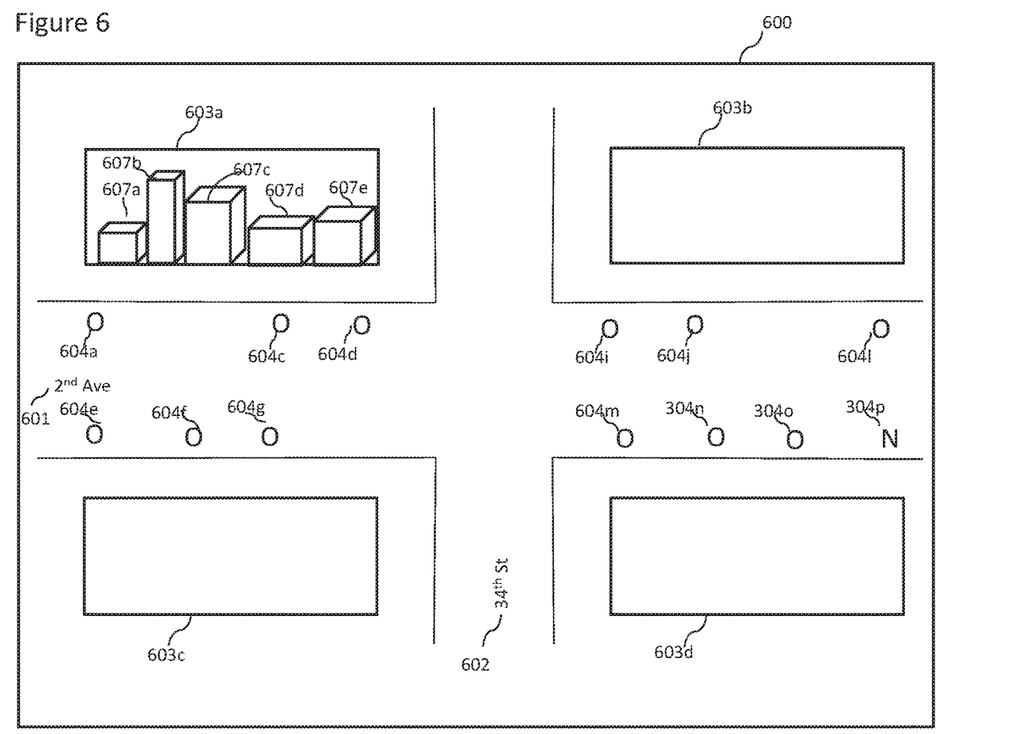
FIG. 6 depicts a schematic diagram of the salient components of a virtualized parking map according to yet another embodiment of the current invention.

FIG. 6 depicts a schematic diagram of the salient components of a virtualized parking map according to yet another embodiment of the current invention. The virtualized map 600 sent by the server 220a includes actual image of the street blocks and street names superimposed on the street image. In this embodiment, the parking spaces are not marked. It only shows the information on currently parked vehicles and whether any location is no-parking zone (N). In this embodiment, a space is available if there is enough room to park in the space while following all parking rules such as no parking within 20 ft. of fire hydrants. The parking status information of the occupied spaces 604a,c-g,i,j,l-p may include the parked vehicles information such as license plate numbers, vehicle make, model and color. The parking meter system can collect the information from the vehicle information stored in the user account information. If there are more than one vehicle associated with the account then the parking meter system can interrogate the UApp for information on the specific vehicle being parked. The street names 601 and 602 are superimposed on the image of the street blocks. The actual image of the virtualized map may include the images of the buildings, parks, etc. as commonly seen in a real map such as a satellite map. The street map 600 is created by the parking meter system using a map database, parking status information and account information stored in the database systems 230. The parking meter system determines the size of the map i.e., how many blocks, which blocks, surroundings of the blocks, etc. from the location information sent by the UApp. The map size selection may also depend on the availability of a parking space in the neighborhood of the vehicle.

The parking meter system can resolve any ambiguity of whether a space is available when the parking spaces are not marked. For example, the server 220a can send detailed information on the restricted space where parking is not permitted. It may specify the length from the corner of a street or buildings address range adjacent to the prohibited parking spaces etc. All other spaces not specifically identified as no-parking zone by the server 220a can be used to park a vehicle as long as it fits in the space.

Certain features are of utility and may be employed in the regulation system of the invention. For example, when the user indicates a vacant parking via the UApp where she intends to park, the space may be prohibited for street repair or for another reason from parking at that time. The operator can implement such parking restrictions as needed in the database without having to send any personnel to put a sign at the parking space. In another example, a user may just park in any available space and just sends the location data when the location data are very accurate. The servers do not need to send virtualized map in this case. The servers check whether there is any restriction in parking in that location. If there is no restriction, the server sends parking validation indication to the UApp. In this case the server does not need to send any virtualized map. Instead it just validates a parking space and the rest of the parking process follows according to the steps described in earlier embodiments. In yet another example, users can check if a meter corresponding to a parked vehicle expired and if so, can notify the operators. The operator can provide incentives to users in the form of parking fee discount or points that can be used for parking or other benefits. With this incentive operators can reduce cost of patrolling through crowd sourcing. In yet another example, a user can reserve a parking space even before arriving there. In that case the input from the user can indicate through the UApp the intended street block for parking. The UApp does not need to send the user location data in this scenario. Instead the UApp sends the intended parking location information in the form of street name and or latitude/longitude coordinates. The operator can implement a policy that the user must pay from the time the space is reserved even if the vehicle is not in the parking space yet. In yet another example, the server can determine from the location data sent by the UApp and the map data stored in the database that the parking space is in a parking deck. The server can send the appropriate virtualized image of the deck instead of the street image to the UApp. The image data may include parking deck floor numbers, parking space numbers, etc. The user selects an appropriate parking space from the virtualized map of the parking deck.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative and are not necessarily drawn to scale. Reference throughout the specification to "first embodiment" or "second embodiment" or "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "first embodiment," "second embodiment," "third embodiment," "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A parking meter system comprising one or more computers configured to perform operations comprising:
    receiving a query and a location identifier identifying a geographic location from a first device communicatively coupled with the one or more computers;
    generating a virtual map comprising conventional map data of a geographic area in proximity to the geographic location and parking space data, wherein the parking space data includes at least one or more parking space status for one or more parking spaces in the geographic area and at least one or more parking space identifiers assigned to one or more of the at least one or more parking spaces in the virtual map;
    sending the virtual map to the first device in response to the query;

receiving from the first device a selected parking space information, wherein the selected parking space information is identified by a first parking space identifier associated with the selected parking space; and allocating the selected parking space responsive to receiving the selected parking space information.

2. The system of claim 1, wherein the operations further comprise:

selecting a vacant parking space in the virtual map, wherein the selected vacant parking space is identified by a second parking space identifier associated with the selected vacant parking space;

sending a selection information for the selected vacant parking space via the virtual map to the first device;

receiving a first confirmation information confirming the acceptance of the vacant parking space selection from the first device;

allocating the selected vacant parking space responsive to receiving the first confirmation information; and sending a second confirmation information confirming the allocation to the first device.

3. The system of claim 1, wherein the operations further comprise:

selecting a geographic area in proximity to the geographic location based at least on the availability of a parking space in the geographic area;

selecting the map data for the geographic area and the parking space data within the geographic area; and combining the parking space data and the map data to create the virtual map.

4. The system of claim 1, wherein the operations further comprise:

selecting the map data for a first geographic area;

selecting the parking space data within the first geographic area;

combining the parking space data and the map data to create a virtual map database;

selecting a second geographic area in proximity to the location identified by the location identifier; and selecting a portion of the virtual map database associated with the second geographic area based at least on the availability of a parking space in the second geographic area, wherein the portion of the virtual map database constitutes the virtual map.

5. The system of claim 1, wherein the map data is data of one or more of a street map, a satellite map, a picture image of the geographical area, and a parking deck, wherein the location identifier is an identifier generated by a GPS location identification device included in the first device, and wherein the parking space identifier is either the location identifier or is derived from the location identifier.

6. The system of claim 1, wherein the location identifier is selected in the virtual map received at the first device, wherein the operations further comprise:

receiving a time information from the first device, wherein the time information is for a reservation time for which a parking reservation is requested by the first device;

selecting a parking space within a geographical area in proximity to the geographic location identified by the location identifier that is to be vacant at the reservation time;

reserving the parking space for the user of the first device for the reservation time; and sending a reservation confirmation to the first device.

7. The system of claim 1, wherein the operations further comprise:

assigning in the virtual map an area of size based on the dimensions of a vehicle as the parking space;

assigning an identifier to the parking space, wherein the identifier is the parking space identifier;

demarcating the parking space with one or more markers for visual recognition of the parking space in the virtual map; and preparing the virtual map for display of the parking space at the first device.

8. The system of claim 1, wherein the operations further comprise:

starting a timer for the determination of a duration of a parking session when the selected parking space is allocated;

receiving a session end indication from the first device that the parking session is to be terminated;

determining the duration of the parking session from the start of the timer to the time of receiving the session end indication;

collecting a payment for the duration of parking from an account associated with the user of the first device via one of a pre-established account, an online payment, and a mobile payment system; and updating the status of the parking space in one or more computers as available.

9. The system of claim 1, wherein the operations further comprise:

receiving from the first device an indication for a duration of parking;

collecting a payment for the duration of parking via one of a pre-established account, an online payment, and a mobile payment system;

starting a timer; and sending an alert to one or both of the first device and a second device owned by an operator of the system when the time accumulated in the timer exceeds the duration of parking.

10. The system of claim 1, wherein the operations further comprise:

receiving a second query and a second location identifier identifying a second geographic location from a second device communicatively coupled with the one or more computers;

obtaining a second virtual map responsive to receiving the second query and the second location identifier, wherein the second virtual map is a map of a neighborhood in proximity of the second geographic location, wherein the second virtual map includes a status indication of one or more parking spaces in the neighborhood of the second geographic location, wherein the status indication includes an expiration indication for one or more of the parking spaces for which the parking session for the one or more parking spaces expired; and sending the second virtual map via a network to the second device.

11. The system of claim 10 further comprises:

a first software program stored in the first device, wherein the first device is a mobile device, wherein the first software program is configured to present the first virtual map on the first device display and to accept an input from the first device; and a second software program stored in the second device, wherein the second device is a mobile device used by an operator of the system, wherein the second device includes a GPS location identification device, wherein the second location identifier is an identifier generated by the GPS device, wherein the second software program is configured to present the second virtual map on the second device display.

12. The system of claim 1, wherein the operations further comprise:
receiving an indication from the first device that a parking space shown to be vacant in the virtual map is occupied by a vehicle, wherein the indication includes at least one of the vehicle license plate number and an image of the vehicle; and
sending an alert to an operator of the system indicating that the vehicle is parked in the space for which parking fee is unpaid.

13. The system of claim 1, wherein the operations further comprise:
checking if a parking space that includes the location identified by the location identifier is allowed for parking;
receiving a first information on the user of the first device to be used for user verification by the system;
receiving a second information on the vehicle to be parked by the user;
authenticating the user based on the first information; and
updating the parking space data based on the second information.

14. A computer implemented method comprising:
receiving a first query and a first location identifier identifying a first geographic location from a first device communicatively coupled with the one or more computers;
obtaining a first virtual map, wherein the first virtual map is a map of a neighborhood of the first geographic location combined with parking space data of the neighborhood, wherein the first virtual map includes at least one or more parking space status for one or more parking spaces in the neighborhood, wherein one or more of the at least one or more parking spaces are identified in the first virtual map by an assigned corresponding parking space identifier;
sending the first virtual map to the first device responsive to the first query;
receiving from the first device a selected parking space information, wherein the selected parking space information is identified by a parking space identifier associated with the selected parking space; and
allocating the selected parking space responsive to receiving the selected parking space information.

15. The method of claim 14 further comprises:
selecting a geographic area in proximity to the first geographic location;
selecting map data for the geographic area from one or more of a street map database, a building map database, and a parking deck map database, stored in the computer;
selecting the parking space data within the geographic area from a parking space database stored in the computer; and
combining the parking space data and the selected map data thereby creating the first virtualized map.

16. The method of claim 14 further comprises:
starting a timer for the determination of a duration of a parking session when the selected parking space is allocated;
receiving a session end indication from the first device that the parking session is to be terminated;
determining the duration of the parking session from the start of the timer to the time of receiving the session end indication;
collecting a payment for the duration from an account associated with the user via one of a pre-established account, an online payment, and a mobile payment system; and
updating the status of the parking space in the one or more computers as available.

17. The method of claim 14 further comprises:
receiving from the first device an indication for a first duration of parking;
collecting a payment for the first duration of parking via one of a pre-established account, an online payment and a mobile payment system;
starting a timer to determine a second duration of a parking session; and
sending an alert to at least one of the first device and a second device owned by an operator of the system when the second duration exceeds the first duration.

18. The method of claim 14 further comprises:
receiving a second query and a second location identifier identifying a second geographic location from a second device communicatively coupled with the computer, wherein the second device is a device used by an operator of the system;
obtaining a second virtual map responsive to receiving the second query and the second location identifier, wherein the second virtual map is a map of a second neighborhood of the second geographic location, wherein the second virtualized map includes a status indication of one or more parking spaces in the second neighborhood, wherein the status indication includes unpaid parking fee information for the one or more of parking spaces; and
sending the second virtual map via a network to the second device.

19. The method of claim 14 further comprises:
receiving an indication from the first device that a specific parking space indicated as vacant in the first virtual map is occupied by a vehicle, wherein the indication includes at least one of the vehicle license plate number and an image of the vehicle;
sending an alert to an operator of the system indicating that the vehicle is parked in a space for which parking fee is unpaid; and
providing an incentive to the user of the first device for sending the indication, wherein the incentive is in the form of a discount for future parking payment, cash, or third-party merchandise discounts.

20. A computer storage medium encoded with a computer program, the program comprising instructions that when executed by a data processing apparatus cause the data processing apparatus to perform operations comprising:
receiving a query and a location identifier identifying a geographic location from a mobile device communicatively coupled with the computer;
selecting a geographic area in proximity to the location identified by the location identifier based on availability of one or more vacant parking spaces in the geographic area;
generating a virtual map for the selected geographic area, wherein the virtual map is created by combining parking space data with one or more of a conventional map data of the geographic area, wherein the parking space data includes at least one or more parking space status of one or more parking spaces in the geographic area and at least one or more parking space identifiers assigned to one or more of the at least one or more parking spaces in the virtual map;

sending the virtual map to the mobile device in response to receiving the query;

selecting a parking space, wherein the selected parking space is identified by the parking space identifier associated with the selected parking space; and sending a parking space allocation information to the mobile device based on the selection of the parking space.

21. The system of claim 20, wherein the operations further comprise:

starting a parking session for the allocated parking space in the virtual map in response to receiving an allocation acceptance information from the first device;

ending the parking session in response to receiving a session ending signal from the mobile device; and collecting a parking fee from an account associated with the mobile device.

22. The system of claim 20, wherein the map data further comprise at least one of street map data, a satellite map data, and a parking deck map data, wherein the parking space data further comprises at least one of a parking space marker, a parked vehicle license plate number, a parked vehicle image, and a vacancy status of the parking space.

23. The system of claim 20, wherein the operation of selecting the parking space is performed by the data processing apparatus either independently or based on a selection information associated with the parking space received by the data processing apparatus from the mobile device, wherein the selection information includes the parking space identifier.

* * * * *